June 19, 1945.   R. L. HALLOCK   2,378,845
GRID FOR ICE TRAYS
Filed Oct. 16, 1940   5 Sheets-Sheet 1

INVENTOR,
Robert Lay Hallock
BY
his ATTORNEY.

June 19, 1945. R. L. HALLOCK 2,378,845
GRID FOR ICE TRAYS
Filed Oct. 16, 1940 5 Sheets-Sheet 2

INVENTOR,
Robert Lay Hallock
BY
his ATTORNEY.

June 19, 1945.  R. L. HALLOCK  2,378,845
GRID FOR ICE TRAYS
Filed Oct. 16, 1940   5 Sheets-Sheet 3

INVENTOR,
Robert Lay Hallock
BY
ATTORNEY.

June 19, 1945.  R. L. HALLOCK  2,378,845
GRID FOR ICE TRAYS
Filed Oct. 16, 1940  5 Sheets-Sheet 4

INVENTOR,
Robert Lay Hallock
BY
ATTORNEY.

June 19, 1945.  R. L. HALLOCK  2,378,845
GRID FOR ICE TRAYS
Filed Oct. 16, 1940  5 Sheets-Sheet 5
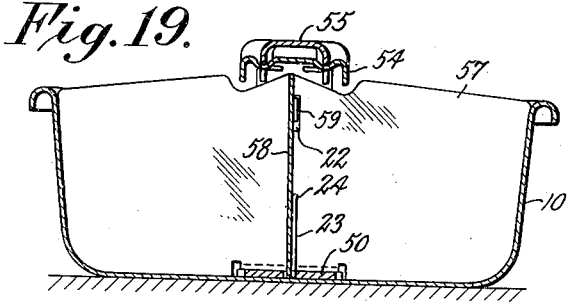
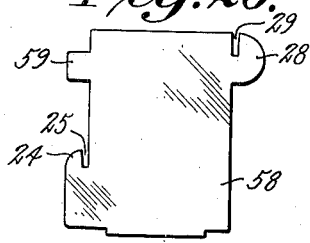
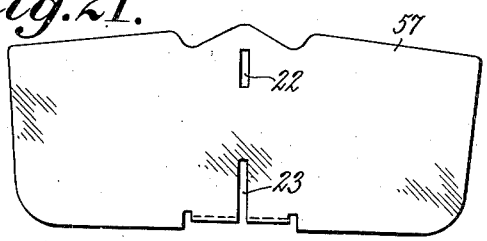
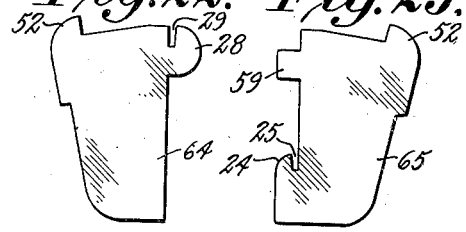
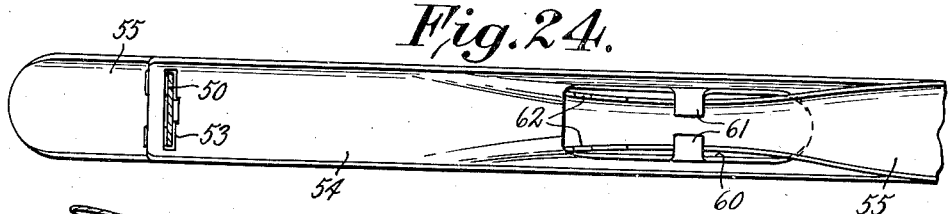
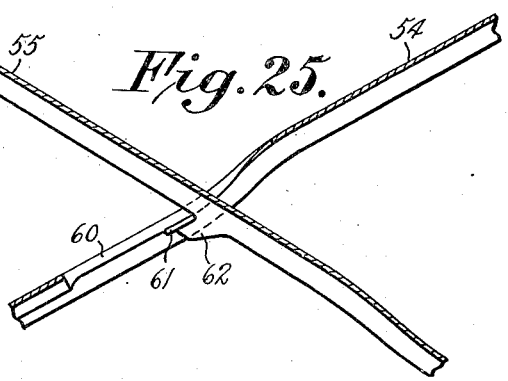
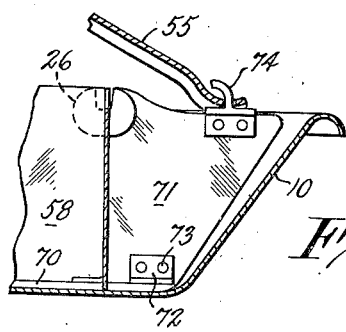
INVENTOR,
Robert Lay Hallock
BY
ATTORNEY.

Patented June 19, 1945

2,378,845

UNITED STATES PATENT OFFICE 2,378,845

GRID FOR ICE TRAYS

Robert Lay Hallock, Larchmont, N. Y.

Application October 16, 1940, Serial No. 361,366

16 Claims. (Cl. 62—108.5)

My invention relates to ice trays and grids therefor of the kind used in household refrigerators, and more particularly to distortable grids or ice tray inserts from which ice pieces or cubes are released by distortion of the grid.

In accordance with my invention an improved mechanism is provided to effect and insure complete loosening and freeing of ice cubes from the wall members of a distortable grid. I accomplish this by providing an improved mechanism of such a character that it is like a toggle-joint in its action and arranged to act at regions of a distortable grid spaced or removed from each other, so that the grid may be subjected to forces in opposite directions at the spaced regions to cause distortion thereof. In the present application disclosure, distorting mechanism of this type is employed in conjunction with grids which become bowed when they are distorted. When the ends of the distorting mechanism are associated with the ends of such a grid and the mechanism is moved toward a straight line position, a large force is produced to cause outward spreading of parts of the grid. In the preferred embodiments illustrated and described herein, the top part of a grid is elongated or stretched by the distorting mechanism while the lower part is contracted or foreshortened, whereby the grid is effectively distorted to effect loosening of the ice pieces due to upward bowing of the grid at its midportion and the movement of the lower portions of grid ends toward each other.

In accordance with my invention, I also provide an improved grid in which not only is relative bodily movement of the grid wall members effected when the grid is distorted, but additional movements of the wall members are produced to improve the freeing and loosening of the ice pieces or ice cubes from the grid wall members. These additional movements include warping and flexing of the individual wall members. By providing a distortable grid in which these additional movements are produced when the grid is distorted, many forces are produced to loosen the ice bonds with greater facility than heretofore possible to insure complete loosening of the ice pieces or cubes from all of the wall members to which they adhere.

In accordance with my invention, therefore, it is an object to provide mechanism for a distortable grid whereby the distortion produced is effective to loosen and free the ice pieces or cubes with greater facility than heretofore possible.

It is another object of the invention to provide an improvement in ice grids in which walls of a grid are individually bent or distorted by structure embodied in the grid when the grid is operated without ice cubes and the walls or partitions are caused to move relatively to each other, thereby facilitating the releasing and loosening of ice pieces or cubes when the grid is operated with ice cubes frozen thereto.

It is a further object of the invention to provide an improved mechanism for a distortable grid in which the mechanism is of such a character that it is like a toggle-joint in its action and capable of producing an enormous force to distort the grid even when a relatively small force is applied to operate the mechanism.

It is a still further object of the invention to provide an improved mechanism for a distortable grid which may be readily operated while the grid is disposed in a tray and ice cubes are frozen both to the walls of the distortable grid and the tray, the mechanism and distortable grid being of such a character that forces are set up within the grid itself and independently of any tray coaction cause release of the ice pieces or cubes from the grid walls and tray walls.

It is a still further object of the invention to provide an improved mechanism for a distortable grid which is like a toggle-joint in its action and associated with the grid in such a manner that it may be moved from a position substantially parallel and close to the top of the grid to an operating position at a region above the grid.

It is a still further object of the invention to provide an improvement in distortable ice grids and distorting mechanism therefor whereby a dimension of the grid is fore-shortened by bowing action at a region against a tray surface within which the grid is positioned for effectively severing the ice pieces or cubes from the tray surface.

The above and other objects and advantages of the invention will become apparent from a consideration of the following description, taken with the accompanying drawings showing preferred forms of the invention and forming part of the specification, it being understood that the embodiments described are illustrative only and that the invention is capable of varied forms of expression.

In the drawings:

Fig. 19 is a vertical sectional view taken on line 19—19 of Fig. 18;

Fig. 20 is a side view of an individual longitudinal wall member of the grid shown in Figs. 17 and 18;

Fig. 21 is a side view of an individual transverse web or cross wall member of the grid shown in Figs. 17 and 18;

Figs. 22 and 23 are side views of the individual center wall pieces employed at opposite ends of the grid shown in Figs. 17 and 18;

Fig. 24 is an enlarged fragmentary sectional view, taken on line 24—24 of Fig. 18, illustrating how the interlocked handles of the distorting mechanism appear when viewed from the under side thereof;

Fig. 25 is a vertical sectional view, taken through the center lines of the handles shown in Fig. 24 when the handles are raised from the horizontal position shown in Fig. 18 to a position similar to the handles shown in Fig. 13; and Fig. 26 is a fragmentary sectional view of a modification in grid and handle structure.

Figure 1:
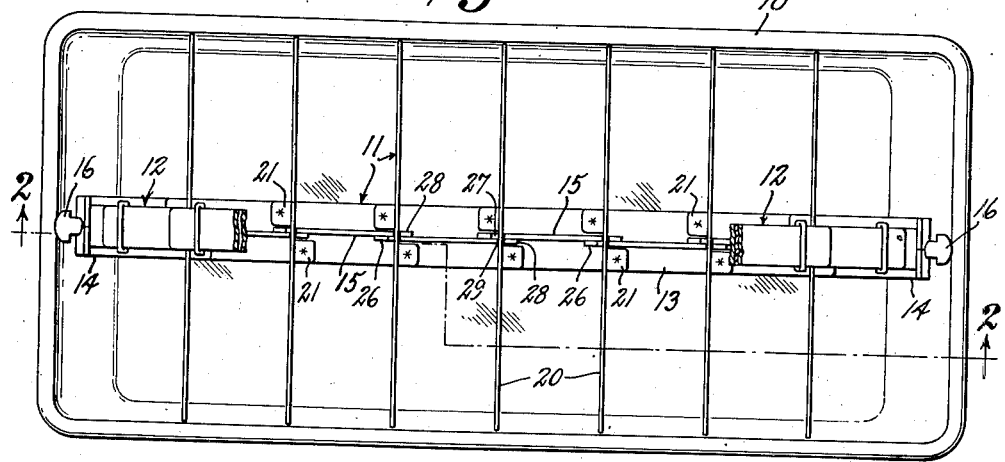
Fig. 1 is a plan view of an ice tray and grid or ice tray insert embodying the invention.

Referring first to the embodiment shown in Figs. 1 to 11, the tray 10 is made of thin metal, such as aluminum, is shallow, open at the top, and flat-bottomed, with slightly outwardly sloping side walls and somewhat more sloping end walls.

The device which is set into the tray to partition the internal space thereof, generally called a grid, consists of the grid proper 11 and a handle 12.

The grid proper 11 includes a backbone 13 which is relatively narrow and extends along the bottom of the tray and has end uprights 14, which may be integral with the bottom part. At least the bottom part of backbone 13 is tempered to constitute a spring. The entire piece may be made of a spring tempered aluminum alloy.

Figure 5:
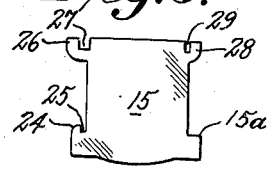
Fig. 5 is a side elevation of an individual longitudinal wall member of the grid shown in Figs. 1 and 2.

The grid includes a number of separate longitudinal wall pieces 15, 15b and 15c, and transverse walls or webs 20, preferably stamped from thin sheet aluminum. Except for the two end longitudinal wall pieces, wall pieces 15 are alike. One such piece 15 is shown in Fig. 5. It includes a lower prong 24 providing a narrow slot 25, a prong 26 directly above prong 24 providing a wide slot 27, a prong 28 at the other end of the top edge providing a narrow slot 29, and a lower projection 15a.

Figure 6:
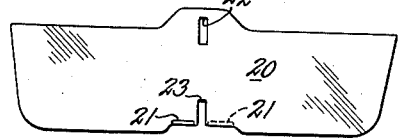
Fig. 6 is a side elevation of an individual transverse wall member of the grid shown in Figs. 1 and 2.
Figure 7:
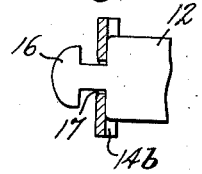
Fig. 7 is an enlarged fragmentary sectional view, taken on line 7—7 of Fig. 2, to illustrate more clearly the connection of one end of the distorting mechanism to an end of the grid.
Figure 8:
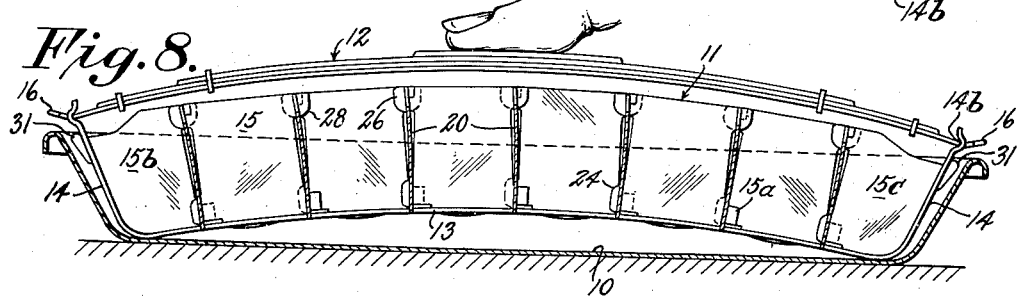
Fig. 8 is a side vertical sectional view of the grid and tray shown in Fig. 1, to illustrate the grid operation when the distorting mechanism is moved from the position shown in Fig. 2 to the position shown in Fig. 8, ice frozen in the tray being omitted for sake of clearness in illustration.

The transverse webs 20 are alike and one such web is shown in Fig. 6. These webs are provided at their lower central portions with oppositely directed webs 21 for attachment to the backbone 13 as by spot-welding or riveting. They have slots 23 at the bottom and apertures 22 near the top. In assembly, prongs 26 and 28 pass through apertures 22. Prongs 24 and projections 15a pass through slots 23.

End wall 15b has an upper prong 28 and a lower projection 15a. It also has a prong 31 which passes through a slot in the upper part of upright 14. End wall 15c has a lower prong 24 and upper prong 26 and a prong 31.

Member 13 has a series of slots 13a which receive projections at the lower parts of wall pieces 15.

The handle 12 is of metal leaf-spring construction having ears 16 at the ends connected to the main part of the lower leaf by necks which pass through apertures 17 in the upper parts of uprights 14. The handle can be made removable by elongating slot 17 vertically so that the ears can pass through the apertures 17 when the handle is in the position shown in Fig. 10. The uprights 14 are formed with depressions 14b into which the necks of the lower leaf of the handle seat when the handle is in raised position.

Figure 2:
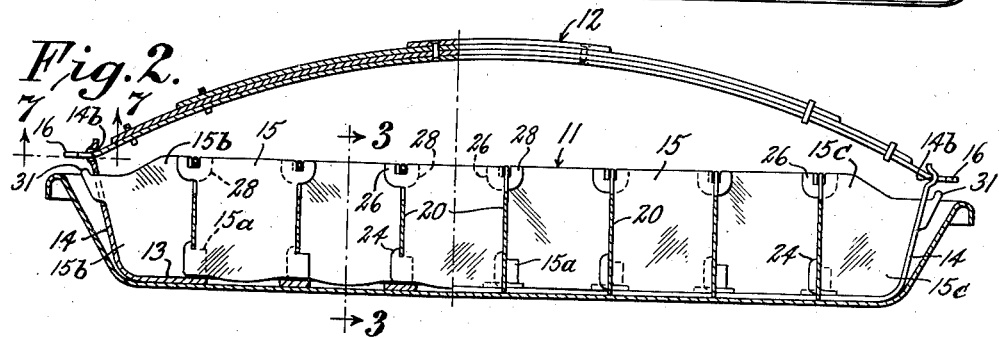
Fig. 2 is a vertical sectional view, taken on line 2—2 of Fig. 1, to illustrate more clearly the unstressed position of the grid in the tray and showing the mechanism for distorting the grid in raised position.
Figure 3:
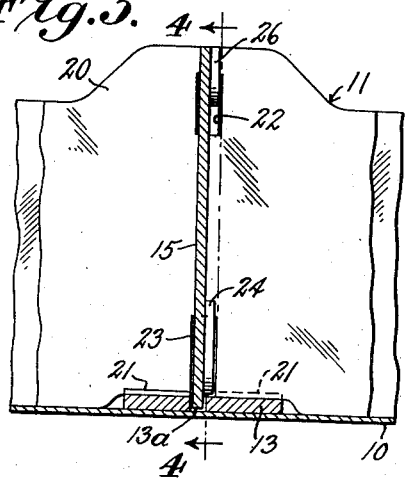
Fig. 3 is an enlarged fragmentary view, taken on line 3—3 of Fig. 2, to illustrate more clearly the manner in which the individual longitudinal wall members and individual transverse wall members of the grid are connected.
Figure 4:
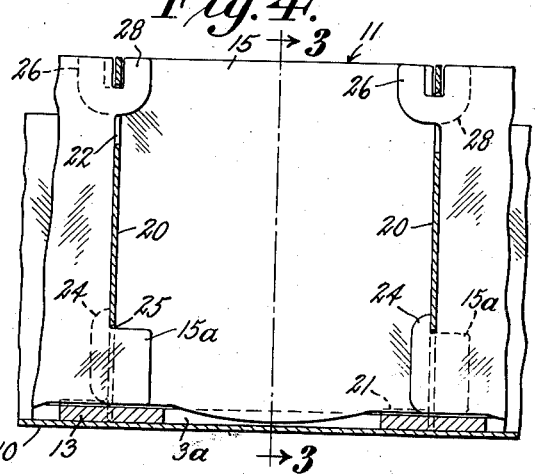
Fig. 4 is an enlarged fragmentary sectional view, taken on line 4—4 of Fig. 3, to illustrate certain parts more clearly which are effective to cause individual bending or distortion of the wall members.
Figure 9:
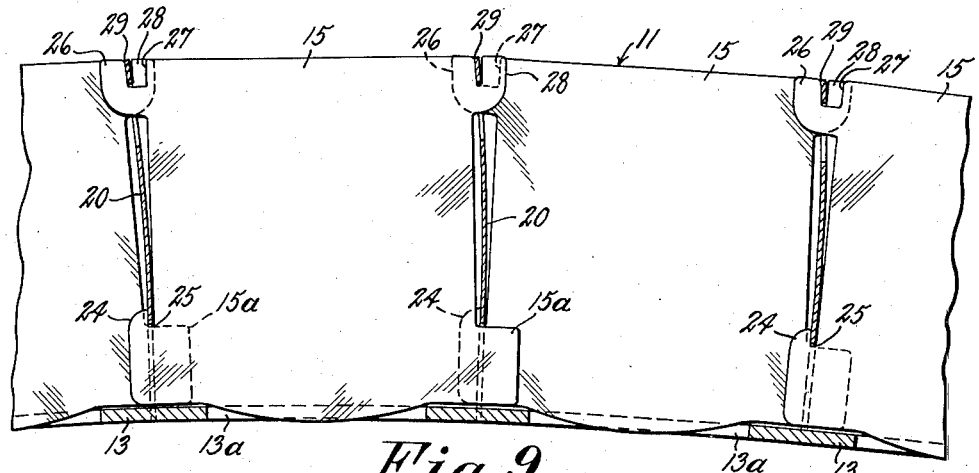
Fig. 9 is an enlarged fragmentary sectional view of the grid as shown in Fig. 8, affording a side view of the individual longitudinal wall members, to illustrate the manner in which the transverse wall pieces are individually warped or flexed when the grid as a whole is distorted.
Figure 10:
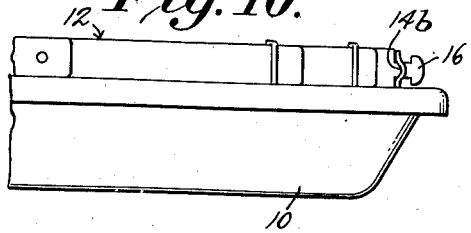
Fig. 10 is a side elevation of the grid and tray shown in Fig. 1 with the toggle distorting mechanism moved from the vertical position in Fig. 2 to a horizontal position.
Figure 11:
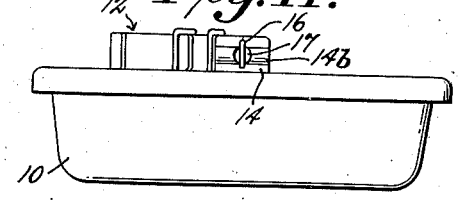
Fig. 11 is an end view of the tray and grid shown in Fig. 10 with the distorting mechanism in its horizontal position.
Figure 12:
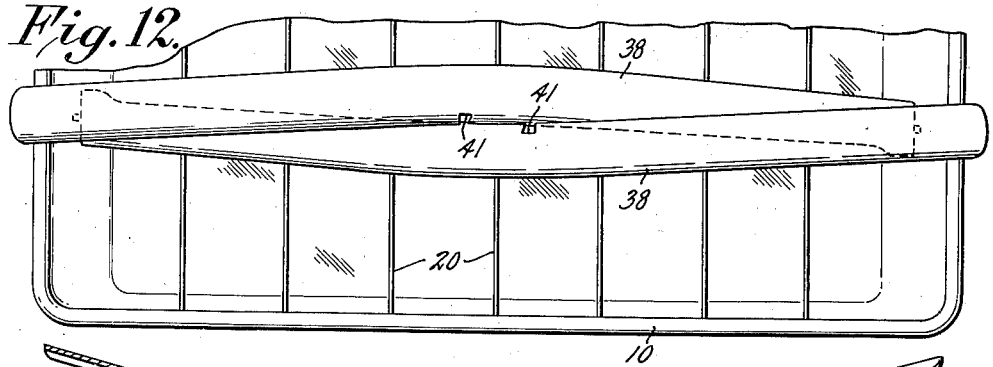
Fig. 12 is a plan view (partly broken away) of an ice tray and grid similar to that shown in Figs. 1 and 2, illustrating another form of mechanism for distorting the grid.

The operation is as follows:

The tray containing water and the grid is placed in a refrigerator with handle 12 in the position shown in Figs. 10 and 11. When the ice is frozen, the tray is removed and the handle raised to the position shown in Fig. 2. Pressure is then applied downwardly on handle 12 while the ice and grid are still in the tray. The resulting action is in part pictured in Fig. 8. The handle acts as a toggle-joint and in tending to straighten exerts opposite outward forces at the upper ends of uprights 14, which spreads the grid along its upper part. The grid is bowed as shown in Fig. 2. It will be understood that a large force is provided lengthwise of the handle of the toggle-joint as this handle approaches straight line position. In the initial movement the uprights 14 contact prongs 31 of end longitudinal wall pieces 15b and 15c. The end forces are transmitted both through backbone 13 itself and through end pieces 15b and 15c. The result is an upward bowing of the grid and flaring of the longitudinal wall pieces and a warping of the transverse wall pieces which causes the ice to be separated from both the tray and the grid walls. This warping action is illustrated in Fig. 9 and can be positively produced when the grid is operated without ice cubes frozen to the grid walls. The slots 25 being of a width equal to or only very slightly greater than the thickness of the transverse webs, they grip the transverse webs a substantial distance above their lower edges and hold them adjacent the longitudinal pieces of which they form a part. Since the slots 29 are also narrow, prongs 28 of adjacent pieces 15 pull the transverse webs away from those pieces 15 to which they are held by prongs 24. Thus the transverse webs are curved or warped as shown in Fig. 9 and the transverse webs are peeled from the ice blocks.

Should there be an excessive spread at any section without separation at other sections, the prong 26 comes into play and contacts the transverse web and transmits the force so that further force causes separation at other sections. These prongs 26 may be omitted if the backbone is heavy enough or strong enough so as to transmit the necessary internal forces. If prongs 26 are omitted, as such, projections similar to 15a would nevertheless be provided in their stead to hold the longitudinal pieces in place.

The upward bowing of the backbone causes upward force against the ice pieces to assist in separating the ice pieces from wall pieces 15.

The one movement of the handle 12 loosens the ice cubes from both the tray and the grid. It will be seen that the separating action is an internal action within the grid itself. Externally of the grid and ice block, the downward pressure must, of course, be balanced by upward reaction, but this has no loosening effect and is a nullity so far as concerns separation of the ice from the tray and grid. Likewise the end thrust does not of itself loosen any cubes. It is the conversion of the downward force into horizontal forces and their transmission through the backbone and the resultant internal forces which severs the bottom of the tray from the ice and loosens the cubes. The change of direction of the forces is an internal change, essentially within spring members themselves. It will be understood that the lower part of the backbone is foreshortened as it bows upwardly.

In the embodiment of my invention shown in Figs. 12 to 15, the grid 11 is like that of Figs. 1 to 11 and operates in the same way. The grid distorting mechanism is different and consists of two overlapping extensions of the grid backbone 13. Handles 38 may be of spring material like the backbone. The handles are biased sideways toward each other so as to press against each other laterally when raised. They are provided with notches 41 in the adjacent sides so positioned that the handles lock in the respective notches when raised by hand to the position shown in Fig. 13. The handles are so tensioned that they tend to move to the horizontal position shown in Fig. 12. The handles can be unlocked when in the position shown in Fig. 13 by spreading them laterally and then they can be allowed to lower themselves to the normal position of Fig. 12.

Figure 13:
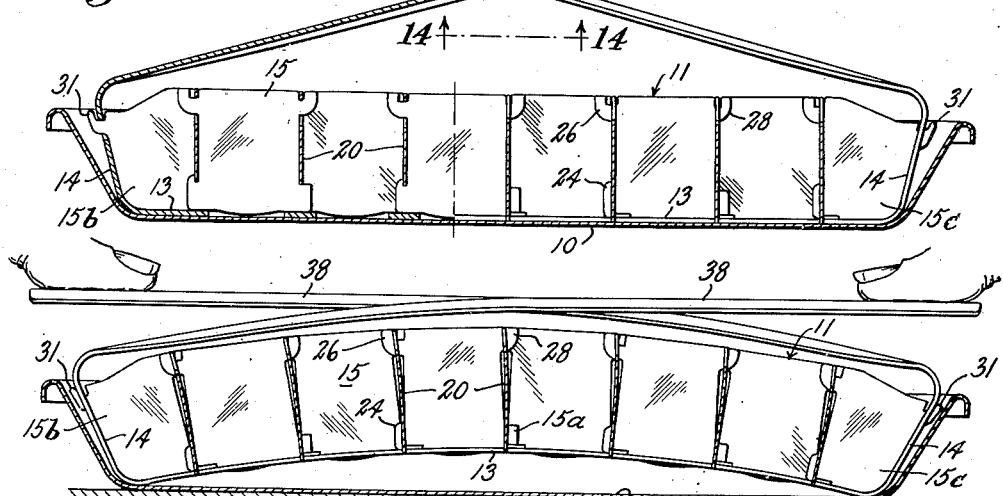
Fig. 13 is a vertical sectional view of the tray and grid shown in Fig. 12 with the handles of the distorting mechanism moved from a substantially horizontal position adjacent the upper edges of the grid wall members to an operating position at a region above the grid.
Figure 15:
Fig. 15 is a vertical sectional view, similar to Fig. 13, illustrating the grid operation when the handles of the distorting mechanism are pressed downwardly from the position shown in Fig. 13 to the position shown in Fig. 15.
Figure 14:
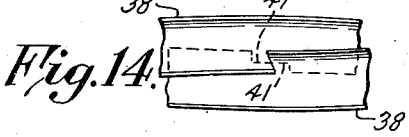
Fig. 14 is an enlarged fragmentary view, taken at line 14—14 of Fig. 13, to illustrate more clearly the manner in which the handles of the distorting mechanism are locked in their upper operating positions.
Figure 17:
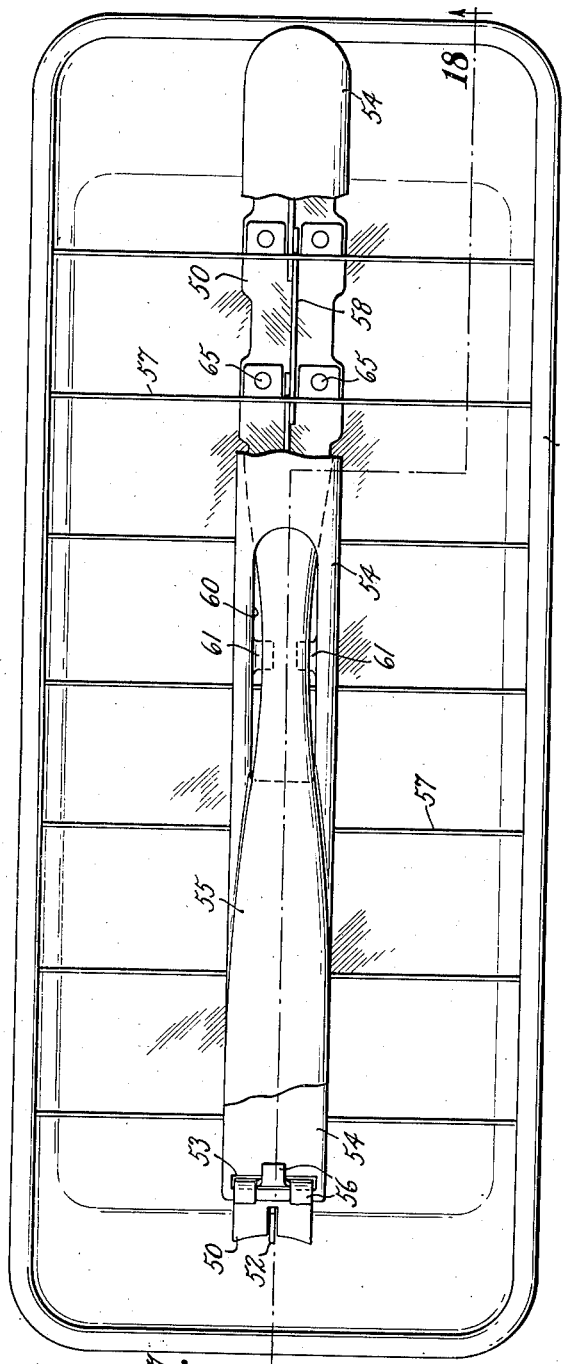
Fig. 17 is a plan view of a tray and grid illustrating another embodiment of the invention with a modified form of grid provided with still another form of distortion mechanism.

With the handles engaged in the position shown in Fig. 13, the grid 11 is distorted by applying downward pressure to the outer ends of the handles. This spreads the uprights 14 with the handles acting as a toggle. The grid is bowed as shown in Fig. 15 and the same warping of the transverse webs takes place as in the earlier described embodiment. Fig. 14 shows how the notches 41 are preferably shaped to give a definite lock and to assure the handles remaining locked when pushed downwardly under stress.

Figure 16:
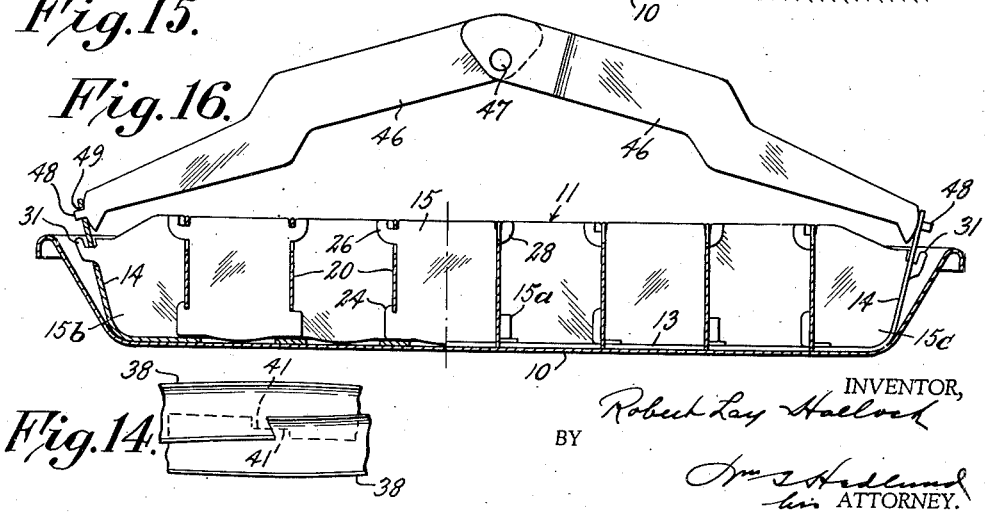
Fig. 16 is a vertical sectional view of the tray and grid shown in the preceding figures provided with still another form of distorting mechanism for distorting the grid in a manner similar to that shown in Figs. 8 and 15.

In Fig. 16 I have shown still another form of distorting mechanism consisting of two rigid arms 46 pivoted to each other at 47 and having ears 48 projecting through and preferably rotatable in holes 49 in uprights 14. The toggle-joint may be removable so that a single toggle-joint may be used with a number of grids.

Another embodiment of the invention is shown in Figs. 17 to 25. The tray 10 may be the same. The backbone 50 is also made of spring stock in this case. The ends extend upwardly and are recessed at 51 to receive ears 52 on end pieces 64 and 65 of the longitudinal wall of the grid. The ends also extend through slots 53 in handle parts 54 and 55 and are turned over at their upper extremities at 56 to loosely hold the handle parts to the backbone. Transverse walls 57 are provided similar to walls 20 of Figs. 1, 2, 3, 4 and 6. These are flanged at the bottom and attached to the backbone 50 by spotwelding, riveting, or in other suitable manner, indicated at 65.

Longitudinal wall pieces 58 are provided which are in general similar to members 15. They have similar prongs 28 (see Fig. 20) and slots 25, functioning in the same manner to warp the transverse wall pieces. Guide projections 59 are provided at the upper ends opposite prongs 28. These may be made like prongs 26 with slots 27. Projections 28 and 59 pass through slots 22 in members 57, when the grid is assembled, and projections 24 pass through slots 23 in members 57. Members 58 are held in place solely by their interlock with the transverse webs.

End piece 64 (Fig. 22) is formed with a narrow gap prong 28. End piece 65 (Fig. 23) is formed with a narrow gap prong 24 and either a guide 59 or a wide gap prong.

Handle 55 passes through an opening 60 in handle 54 which is provided with ears 61 adapted to engage under ears 62 on handle 55 when the handles are raised to the position shown in Fig. 25.

Figure 18:
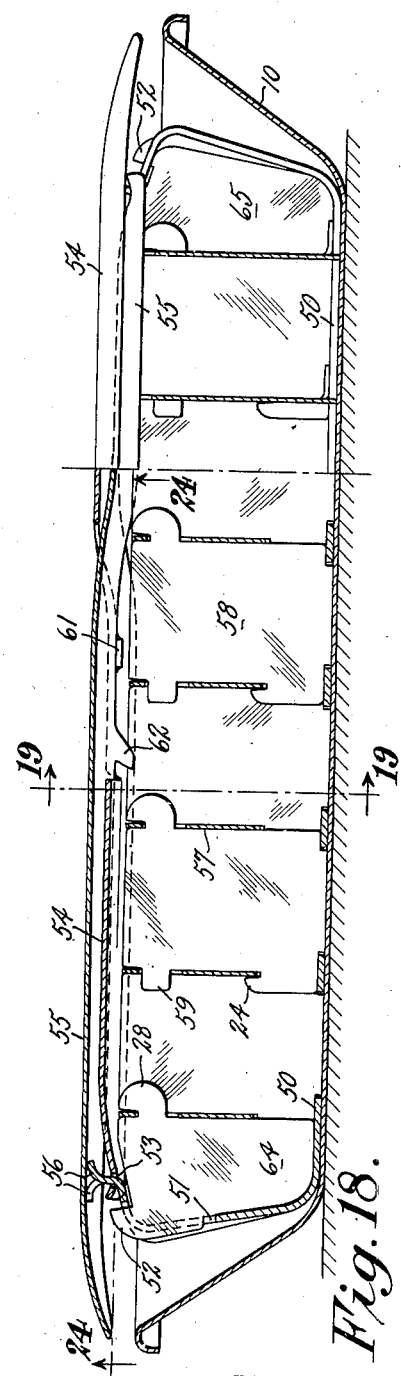
Fig. 18 is a vertical sectional view, taken on line 18—18 of Fig. 17, to illustrate features of the grid and distorting mechanism more clearly.

In operation, ice is frozen with the grid handles in the position shown in Fig. 18. To obtain ice cubes, the handles are lifted and locked in the position shown in Fig. 25. Downward pressure is then applied to one or both handles which spreads the upright ends of backbone 50 apart. After these upright ends engage ears 52, a bowing action is transmitted to the grid as in the case of the other embodiments. At the same time the transverse wall members are individually warped by the action of prongs 24 and 28 engaging the transverse webs on opposite sides near the bottoms and tops of the transverse webs respectively.

A modification is shown in Fig. 26 in which the spring backbone member 70 is flat and terminates substantially at the end walls of the tray 10. The longitudinal end web or wall piece 71 takes over the function of the upright backbone in transmitting the operating force. For this purpose end piece 71 is made of heavier stock than pieces 58. It is secured to backbone 70 as by a clip 72 on each side of wall 71. I prefer that wall 71 have some slight movement ahead of the main bowing action and before warping of any transverse webs so as to first provide a cutting action to separate the end ice cubes. This can be obtained by giving to end piece or plate 71 a proper size and connection to clip 72; or rivets 73 in clips 72 may have movement in oversize holes in plate 71. With the plate 71 being provided with a prong like the prong 24 in end wall 15c in Fig. 2, the gap therein may be widened to give the desired first movement of wall 71. The same applies to a prong at the opposite longitudinal end wall like the prong 28 in end wall 15b in Fig. 2. A wide gap prong 26 may be provided on wall 71 to assure force transmission through the same to other parts of the grid. A standard 74 is attached to the upper part of wall 71 and passes through a slot in the handle and provides the abutment against which the handle exerts its lengthwise thrust.

It will be apparent that variations may be made within the spirit and scope of the invention.

What I claim is:

1. In a grid for an ice tray, a flexible wall element, and plates having prongs projecting through the plane of said element and adapted to engage opposite sides thereof at spaced points, said plates being movable to cause said prongs to flex said element.

2. In a distortable grid for an ice tray, a plate member having a narrow slot and a wider slot at one vertical edge thereof and another plate having a part engaged in the narrow slot and another part engaged in the wider slot.

3. A grid having a handle at the top thereof, said handle being pivoted at its ends to said grid and operable in the manner of a toggle-joint to spread and move the ends away from each other to distort the grid.

4. In a grid for an ice tray, a flexible backbone, and mechanism operable in the manner of a toggle-joint to cause upward bending of the center of the flexible backbone so that the end portions thereof are brought closer together.

5. A distortable grid including a plurality of compartment forming members arranged to move with respect to each other when the grid is distorted, and mechanism constructed and arranged to operate in the manner of a toggle-joint and operable to cause force application in opposite directions at spaced points of the grid when hand pressure is applied downward on said mechanism to move the latter toward a straight line position to effect distortion of the grid.

6. A distortable grid as set forth in claim 5 in which said mechanism includes two handles movable from a substantially horizontal position adjacent the top of the grid to an upper locked position at which hand pressure may be applied to cause said handles to move toward a straight line position.

7. A distortable grid as set forth in claim 5 in which said mechanism includes two handles movable from a substantially horizontal position adjacent the top of the grid to an upper locked position at which hand pressure may be applied to cause said handles to move toward a straight line position, and said handles including outer portions extending beyond the locked region to increase the force multiplication produced by said mechanism when hand pressure is applied to one or both said outer portions.

8. A grid as set forth in claim 5 in which said mechanism includes two handles disposed more or less in side by side relation in a substantially horizontal position adjacent the top of the grid, said handles having notches which become effective to lock said handles together when the latter are moved from the substantially horizontal position to vertically extending positions at which hand pressure may be applied to cause said handles to move toward the straight line position.

9. A grid as set forth in claim 5 in which said mechanism includes two handles, one of which is provided with an opening through which the other always passes, said handles normally being disposed in a substantially horizontal position adjacent the top of the grid and movable from such horizontal position to vertically extending positions, and said handles being constructed and arranged so that they may be locked when moved to the vertically extending positions at which hand pressure may be applied to cause said handles to move toward a straight line position.

10. In a grid for an ice tray, a distortable member, mechanism associated with said grid and operative to assume a first position at the top of said grid, such mechanism being movable from said first position to a second position above said grid, and said mechanism in said second position being operable in the manner of a toggle-joint to cause distortion of said member.

11. In a grid for an ice tray, a spring, mechanism associated with said grid and operative to assume a first position at the top of said grid, such mechanism being movable from said first position to a second position above said grid, and said mechanism in said second position being operable in the manner of a toggle-joint to cause bending of said spring.

12. In a grid for an ice tray, a flexible backbone, mechanism associated with said grid and operative to assume a first position at the top of said grid, such mechanism being movable from said first position to a second position at the top of said grid, and said mechanism in said second position being operable in the manner of a toggle-joint to cause flexing of said backbone.

13. In a grid for an ice tray, a distortable wall structure, mechanism associated with said grid and operative to assume a first position at the top of said grid, such mechanism being movable from said first position to a second position above said grid, and said mechanism in said second position being operable in the manner of a toggle-joint to cause distortion of said wall structure.

14. A grid having a flexible bottom member and upright ends, said ends being capable while being spread apart of bending said bottom member, a toggle-joint connected to said ends and movable from a first position at the top of said grid to a second position above said grid, and said toggle-joint in said second position being operable when force is applied thereto to spread said upright ends apart.

15. A grid for an ice tray including a normally straight sided resilient member, mechanism operable in the manner of a toggle-joint, said mechanism being pivotally connected to said member at spaced apart points and movable from a first position at the top of said grid to a second position above said grid, said mechanism in said second position being operable to flex said member when force is applied thereto, and ice cube compartment walls mounted on said member.

16. A tray and grid assembly including a tray and a grid having a part normally resting against said tray where an ice bond is frozen between the grid and the tray, mechanism operable in the manner of a toggle-joint associated with said grid, such mechanism being operative to assume a first position at the top of said grid and movable therefrom to a second position above said grid, and said mechanism in said second position being operable when force is applied thereto to cause distortion of said part and effect separation of said part from the tray and break the ice bond formed therebetween.

ROBERT LAY HALLOCK.